(12) United States Patent
Shen et al.

(10) Patent No.: US 6,415,389 B2
(45) Date of Patent: Jul. 2, 2002

(54) JUMPERLESS COMPUTER SYSTEM

(75) Inventors: Jerry Shen; Hsien-Yueh Hsu, both of Taipei (TW)

(73) Assignee: ASUSTeK Computer Inc., Peitou (TW)

( * ) Notice: Subject to any disclaimer, the term of this patent is extended or adjusted under 35 U.S.C. 154(b) by 0 days.

(21) Appl. No.: 09/795,141

(22) Filed: Mar. 1, 2001

Related U.S. Application Data (62) Division of application No. 09/054,975, filed on Apr. 3, 1998.

(51) Int. Cl.[7] .............................. G06F 1/26; G06F 1/28; G06F 1/30
(52) U.S. Cl. ......................... 713/330; 713/320; 713/1; 713/2; 710/300; 710/301
(58) Field of Search ................ 713/300–340, 713/1, 2, 100; 710/101, 102, 103, 300, 301, 302, 303, 304

(56) References Cited

U.S. PATENT DOCUMENTS

| | | | | | |
|---|---|---|---|---|---|
| 5,727,208 A | * | 3/1998 | Brown | ........................ | 713/100 |
| 5,838,929 A | * | 11/1998 | Tanikawa | .................... | 710/102 |
| 5,918,023 A | * | 6/1999 | Reeves et al. | .............. | 710/102 |
| 6,035,357 A | * | 3/2000 | Sakaki | ........................ | 710/102 |
| 6,094,367 A | * | 7/2000 | Hsu et al. | ...................... | 363/78 |

* cited by examiner

*Primary Examiner*—Rupal Dharia
(74) *Attorney, Agent, or Firm*—Winston Hsu (57) ABSTRACT

An insert signal generation circuit connected to a socket for generating an insert signal as a processor is inserted into a processor socket. The circuit includes an insert detection circuit connected to the socket for generating a detection signal as the processor is inserted in the processor socket. A Smith trigger is provided in the circuit to, responsive to the detection signal, generate a pulse signal. A flip-flop is provided in the circuit to, responsive to the pulse signal, to generate the insert signal.

3 Claims, 8 Drawing Sheets

JUMPERLESS COMPUTER SYSTEM

This application is a division of Ser. No. 09/054,975 filed Apr. 3, 1998.

FIELD OF THE INVENTION

The invention relates to a jumperless computer system.

BACKGROUND OF ARTS

As people use more office-automation equipment than ever, the majority of users of a highly sophisticated computer system nowadays are layman. Therefore, the trend of the computer system being a user-friendly home appliance, which is observed from current industrial standard such as PC 97, ACPI, is obvious and irreversible.

With respect to a computer system, more and more users wish to configure the computer system within a very short of time. When upgrading the computer system, the user also wishes a simple upgrade procedure.

Most current mother boards of the computer system include a plurality of jumpers which function to adjust the parameters in association with the operation of the computer system. The operation parameters include, for instance, the operation frequency of the processor (CPU), the multiple ratio between the host bus clock and the internal clock, etc. When the jumpers are not adequately set, either the computer system can not boot up or, in a worse situation, some hardware components may be damaged.

We classify the jumpers on the mother board into two categories. The first category of jumpers are those, when incorrectly set up, critical to the successful boot-up of the computer system. The second category of jumpers are those, when incorrectly set up, which diminish the performance of the computer system. Based on the foregoing statements, the invention provides a hardware implementation together with a corresponding software method to tackle this problem.

The main object of the invention aims to handle the first category of jumpers. With the invention, a jumperless mother board or computer system is made possible.

SUMMARY OF INVENTION

A jumperless computer system is provided. The user might reconfigure the computer system, as a new processor is inserted into a processor socket, through a software approach.

The computer system includes a circuit, responsive to insert of a processor into a socket coupled to the circuit, generating an insert signal.

The insert signal generation circuit includes an insert detection circuit, a trigger means and a register.

The insert detection circuit is connected to the socket for generating a detection signal as the processor is inserted into the socket.

The trigger means is responsive to the detection signal and generates a pulse signal.

The register is responsive to the pulse signal and generates the insert signal.

DETAILED DESCRIPTIONS OF THE PREFERRED EMBODIMENT

Figure 1:
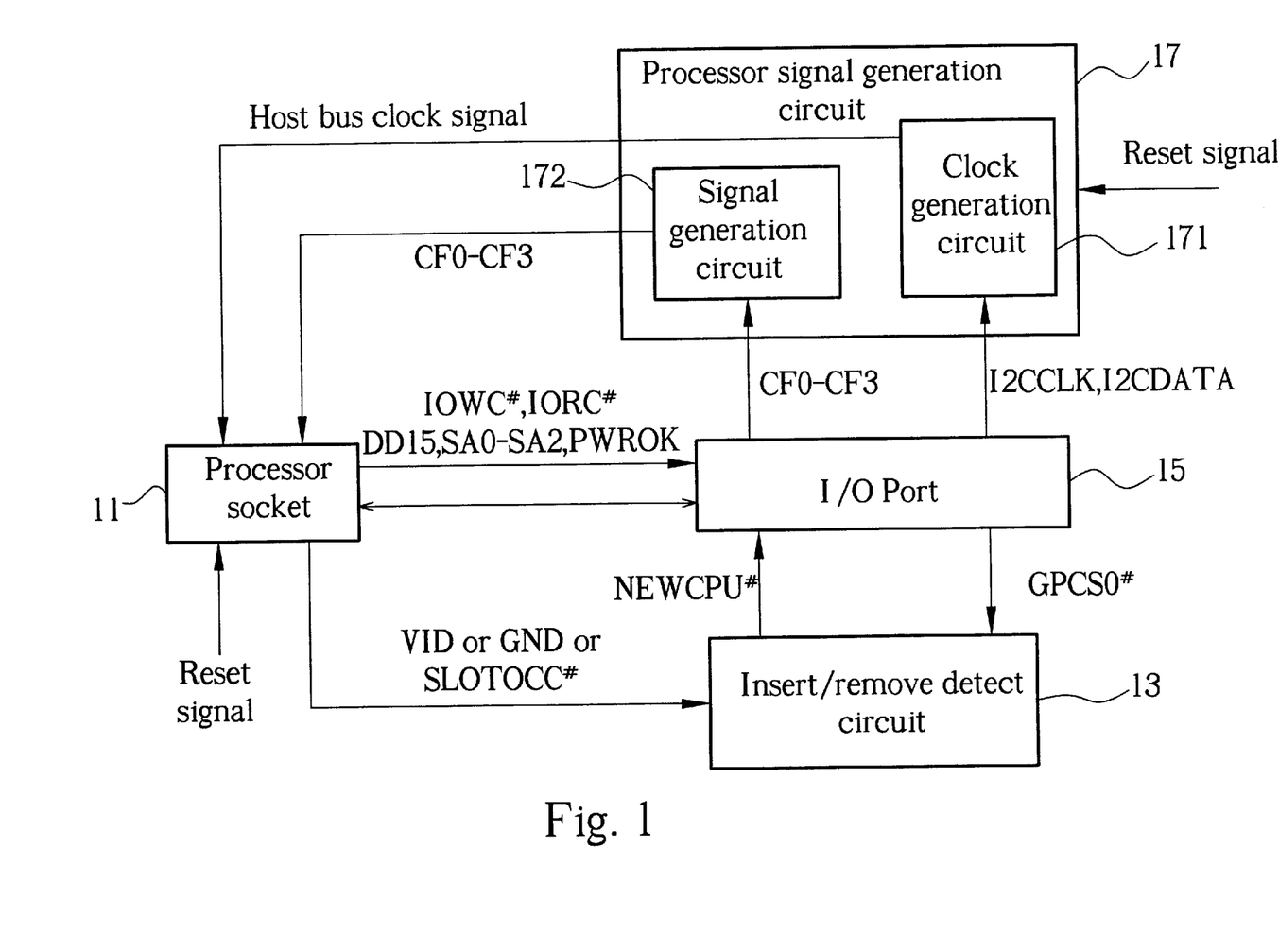
FIG. 1 discloses the main functional blocks of the invention.

As shown in FIG. 1, the invention includes a processor socket 11, an insert/remove detect circuit 13, an I/O port 15 and a processor (CPU) signal generation circuit 17.

I/O port 15 controls other three blocks and accomplish the system's configuration under the control of the ROM BIOS which is connected to the ISA bus (not shown). Since some configurations need the reset signal to effect, a reset circuit is required to generate the reset signal to the processor within the CPU socket 11 under the control of the BIOS. In general, a reset circuit within the system chipset (not shown) on the mother board issues this reset signal. The insert/remove detect circuit 13 has three ways, as described below, to detect whether a processor is inserted in the socket 11 or a processor has been removed from the socket 11. The processor (CPU) signal generation circuit 17 inputs the I2CCLK, I2CDATA and, as the reset signal is activated, the processor (CPU) signal generation circuit 17 provides a corresponding host bus clock signal and the strap signals CF0–CF3 to the processor.

Figure 2:
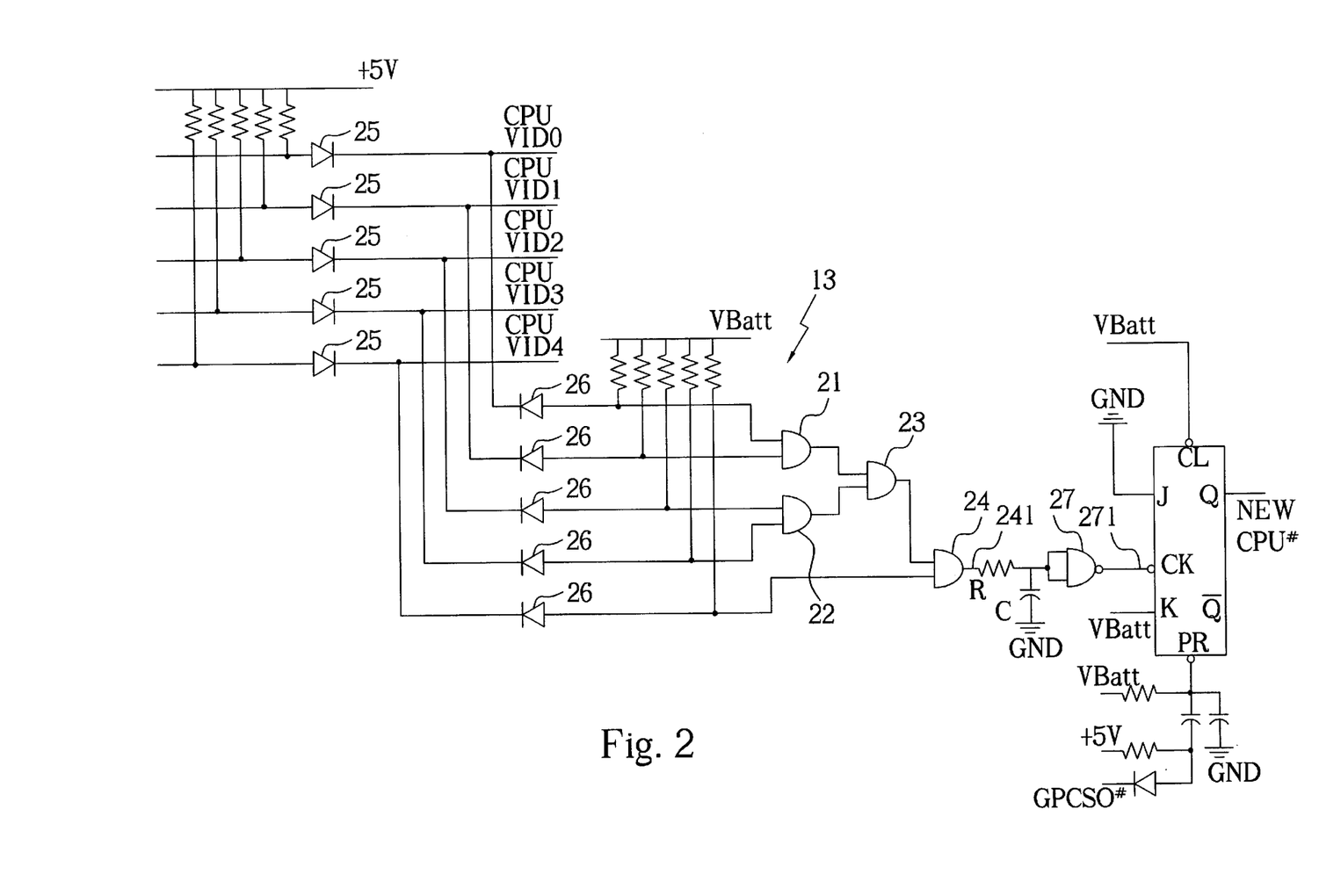
FIG. 2 discloses an embodiment of the insert/remove detect circuit 13 in FIG. 1.

The first approach is to use the CPU voltage identify pin (VID). Some CPUs provide VID functions, e.g. INTEL PENTIUM PRO. Taking the INTEL PENTIUM PRO CPU as the example, the kind of CPU provides VID0, VID1, VID2, VID3 and VID4 pins. The embodiment for the first approach is shown in FIG. 2. Five signal lines including VID0, VID1, VID2, VID3 and VID4 are respectively connected to the external supply +5V via respective resistors. Therefore, the condition of all VID pins=1 indicate no CPU being inserted. To the contrast, condition of any one of VID pin=0 indicates existence of the CPU. To guarantee this circuit functions even during the time period without the external supply +5V, the five signal lines VID0 through VID4 are respectively connected to a battery supply, Vbatt, via respective resistors. Each diode 25 functions as an isolator which prevents the discharge of the Vbatt. Each diode 26 functions as an isolator which prevents damage of +5V to the battery, Vbatt. The resistor (R) and capacitor (C) circuit function to remove the noise.

The insert/remove detect circuit 13 mainly includes AND gates 21, 22, 23, 24 the function of which are detecting whether VID0 through VID4 are all logic 1. As any of VID lines=0, it indicates a CPU being inserted. The AND gate 24 outputs a negative-going edge of an insert signal 241. As the CPU is removed, VID0 through VID4 lines are all 1, and the AND gate 24 outputs a positive-going edge of the insert signal 241. The insert signal 241 is input to an inverted Smith trigger 27 and from which a signal 271 is output accordingly. The signal 271 is input to a clock terminal of a flip-flop 28 which is activated by the negative-going edge of the signal 271. As the result, when a CPU is inserted, the flip-flop 28 outputs an activated NEWCPU# signal.

As the CPU is removed, the insert signal 241 changes from low level to high level. However, the level change does not activated the inverted Smith trigger 27 and, therefore, the NEWCPU# signal remains the current state. To preset the NEWCPU# signal, the GPCS0# signal must be activated to low level. As such, the PR terminal inputs a negative-going signal which in turn resets the NEWCPU# signal to high level.

Figure 3:
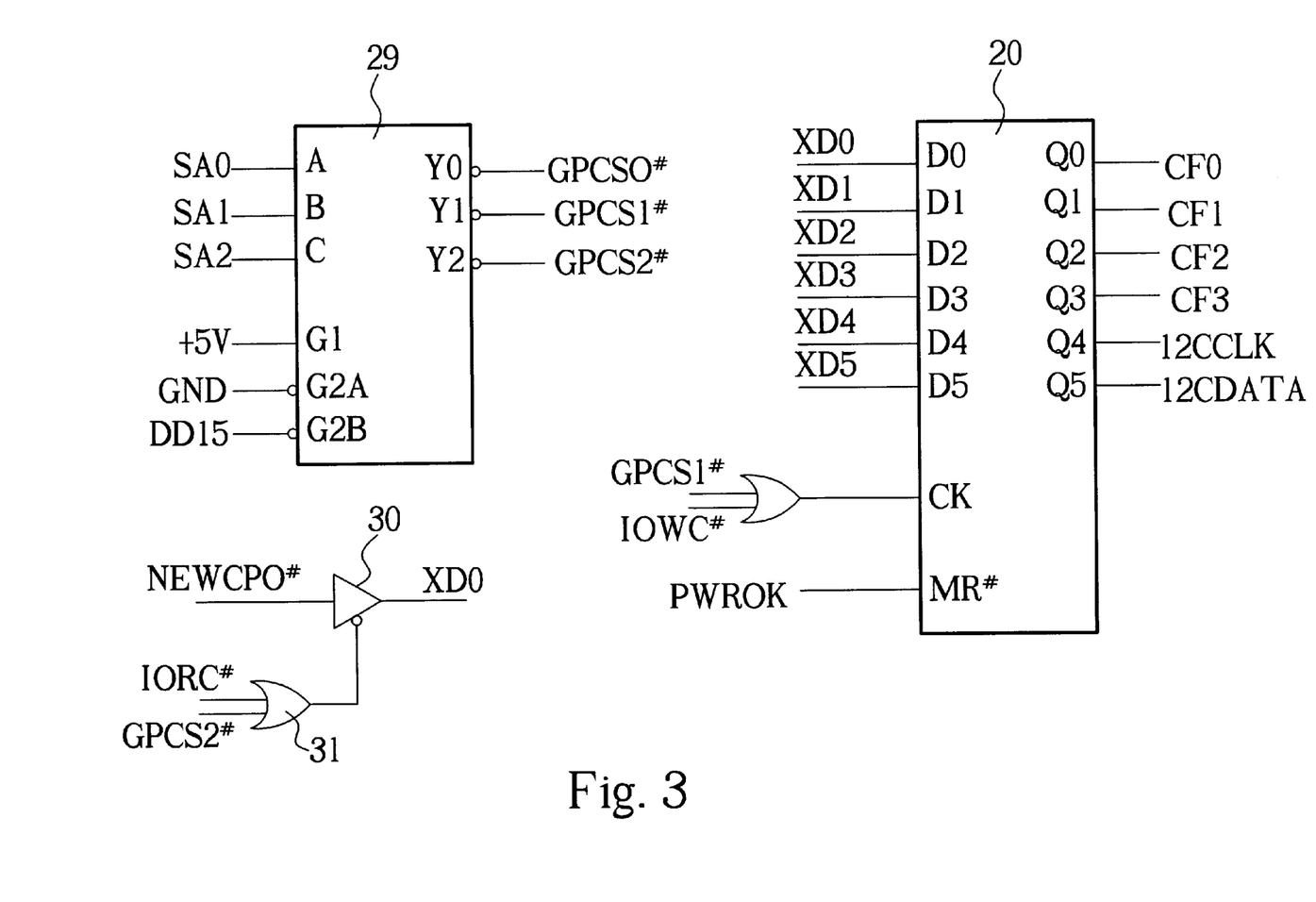
FIG. 3 discloses an embodiment of the I/O port 15 in FIG. 1.

As shown in FIG. 3, an embodiment of the I/O port 15 includes a decoder 29, an input port 30 and an output port 20. The signal GPCS0#, GPCS1# and GPCS2# are generated by the decoder 29. The DD15 signal, which is output from a not shown system chipset and corresponds to a set of I/O ports (programmable), is the access signal to the I/O port. Via the DD15 signal together with SA0, SA1, SA2 signals, the decoder 29 decodes to generate the GPCS0#, GPCS1#, GPCS2# signals for accessing one corresponding port within the set of I/O ports.

The output port 20 functions to latch the signals of XD0, XD1, XD2, XD3, XD4, XD5 and output the corresponding signals CF0, CF1, CF2, CF3, I2CCLK, I2CDATA. The CF0, CF1, CF2, CF3 signals are the required strap signal to the processor. The I2CCLK, I2CDATA signals instruct the clock generation circuit 171 to generate a corresponding host bus clock. It is to be noted that some chipsets provide functions of the I2CCLK, I2CDATA signals which can be utilized by the invention directly.

The reset terminal (MR#) of the output port 20 inputs the Power OK signal (PWROK). Therefore, during power on, the output port 20 is reset and outputs CF1=0, CF2=0, CF3=0, I2CCLK=0, I2CDATA=0. And this set of values will force the processor signal generation circuit 17 to generate a much lower frequency clock, compared with the nominal value, which may boot up CPU of different operating clock frequency.

As the 74LS174 is selected as the output port 20 and the users want to change values for the set of CF1, CF2, CF3, I2CCLK, I2CDATA, it is required to send new XD0, XD1, XD2, XD3, XD4, XD5 signals into the input terminal D0, D1, D2, D3, D4, D5 respectively. At the same time, the GPCS1#, IOWC# signals are activated. At the time when the signals GPCS1#, IOWC# experience a positive-going edge, the value of XD0, XD1, XD2, XD3, XD4, XD5 are latched into the output as the CF1, CF2, CF3, I2CCLK, I2CDATA signals respectively. It is obvious that options other than 74LS174 are available for the output port 20.

The input port 30 is a tri-state buffer. The signals IORC#, GPCS2# are undergo an OR operation and the resulted signal is output to control the tri-state buffer. As signals IORC#, GPCS2# are all at low levels, the value of NEWCPU# is transmitted to the XD0 signal line which is accessed by the BIOS.

Referring back to FIG. 1, the processor signal generation circuit 17 includes a clock generator 171 and a strap signal generator 172. The clock generation circuit 171 inputs the I2CCLK, I2CDATA and, as the reset signal is activated, provides a corresponding host bus clock signal to the processor in the socket 11. During the period of power on, the clock generation circuit 171 provides a much lower frequency clock which allow the boot up of all different CPUs. Afterward, in accordance with the configuration in CMOS RAM or the instruction of the user, the clock generation circuit 171 change the frequency of clock. It is to be noted that during the change of clock frequency, the transition must occur slowly to prevent hang-up of the computer system resulting from the incapability of the locking operation of the phase lock loop (PLL) within the CPU.

The strap signal generation circuit 172, as the reset signal is activated, generates the strap signal CF0–CF3 required by the CPU. The CPU uses this set of values to set up the speed of CPU's internal clock signal, i.e. the frequency multiple ratio. In other words, the CF0–CF3 are used to set up the ratio between the CPU's internal clock and the host bus clock. During the power on, a set of values of CF0–CF3 is provided to guarantee the successful boot-up of the computer system. Afterwards, in accordance with the set-up values of CF0–CF3 from the I/O port 15, a corresponding adjustment is made. These strap signals are all generated responsive to the reset signal. After BIOS configures the output values of the I/O port 15, the reconfiguration of CF0–CF3 takes effect by re-issuing a reset signal again to strap signal generation circuit 172. The reset circuit for generating the reset signal might be implemented with the I/O port circuit 15 or the reset signal might be retrieved from the system chipset if available.

Figure 4A:
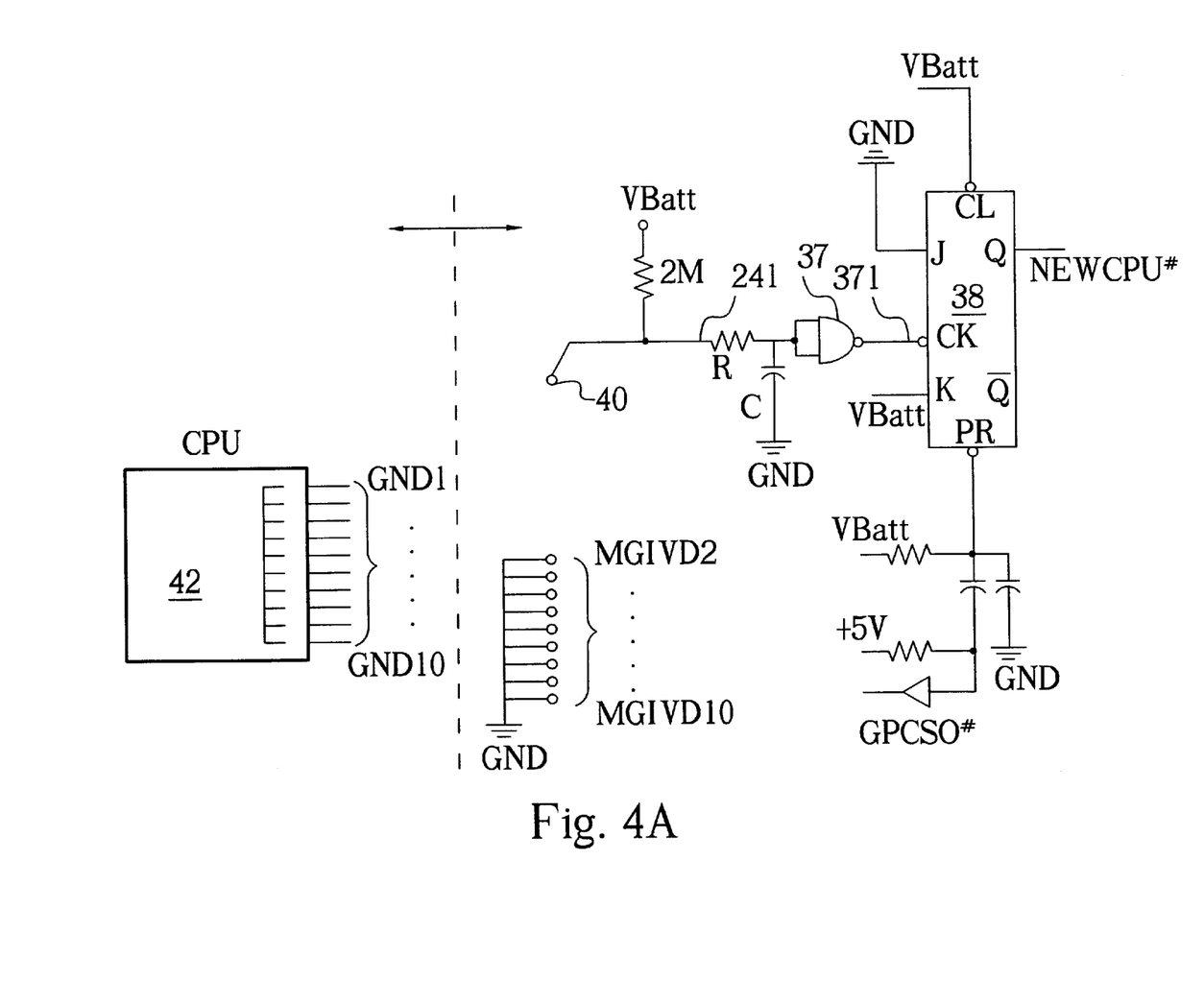
FIG. 4(A) discloses another embodiment of the insert/remove detect circuit 13 in FIG. 1.

The second approach to detect the insert/remove action of the processor is to utilize the power supply signal, e.g. the GND pin or SLOTOCC# pin provided by CPU type of INTEL KLAMATH (or known as Pentium II). Referring to FIG. 4(a), the terminal 40 of the socket 11 corresponding to GND1 pin of the CPU 42 is connected to a Vbatt via a large resistor, i.e., 2M, while other terminals MGND2 through MGND10 respectively corresponding to other GND pins are all connected to ground. All GND signal lines within the CPU 42 are interconnected. Therefore, the output signal corresponding to the GND1 pin is selected as the indication signal 241. If the CPU 42 is inserted, the indication signal 241=GND, and the indication signal 241=HIGH while no CPU is inserted. This indication signal 241 is input to the inverted Smith Trigger 37. The operations of the other devices in FIG. 4(A) are similar to those in FIG. 2 and the more elaboration may be found in corresponding recitation in association with FIG. 2.

Figure 4B:
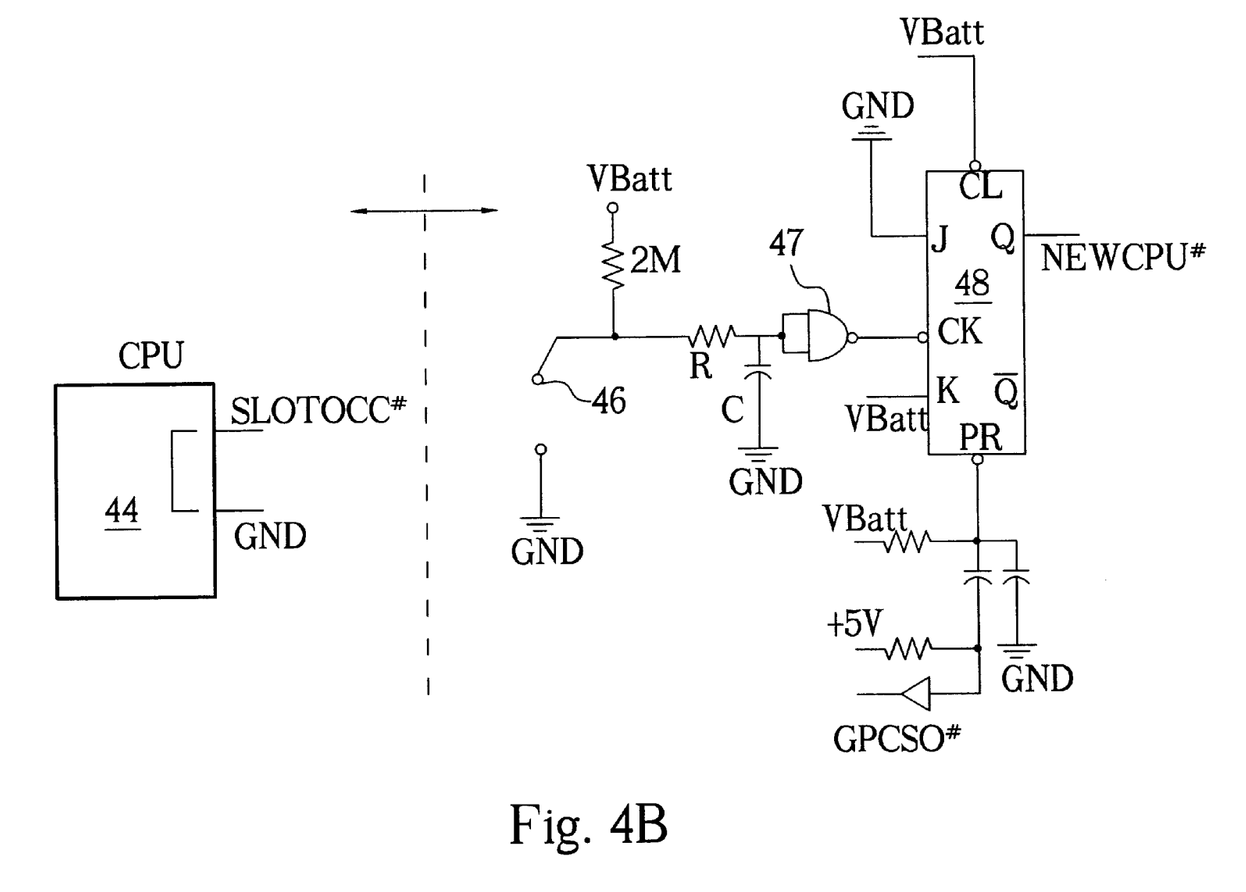
FIG. 4(B) discloses still another embodiment of the insert/remove detect circuit 13 in FIG. 1.

Referring to FIG. 4(B), the terminal 46 of the socket 11 corresponding to SLOTOCC# pin of CPU 44 is connected to a Vbatt via a large resistor, i.e., 2M, while other terminals respectively corresponding to other GND pins are all connected to ground. And the output signal corresponding to the SLOTOCC# pin of CPU of KLAMATH kind is selected as the indication signal 241. The indication signal 241=LOW as a CPU 44 of KLAMATH type is inserted. On the contrary, the indication signal 241=HIGH corresponding to SLOTOCC# pin as no CPU is inserted. The operations of the other devices in FIG. 4(B) are similar to those in FIG. 2 and FIG. 4(A) and more elaboration may be found in corresponding recitation in association with FIG. 2.

Under a well known ZIP (Zero Insert Force) structure, the ZIF mechanism must be open to remove the processor or to insert the processor. Therefore, in the insert/remove detect circuit 13 of FIG. 2, the indication signal 241 input to the inverted Smith trigger 27 may, alternatively, be generated by the ZIF processor's socket. From the open/close action of the ZIP mechanism, it may generate an indication signal 241 which is input to the inverted Smith trigger 27.

Figure 5:
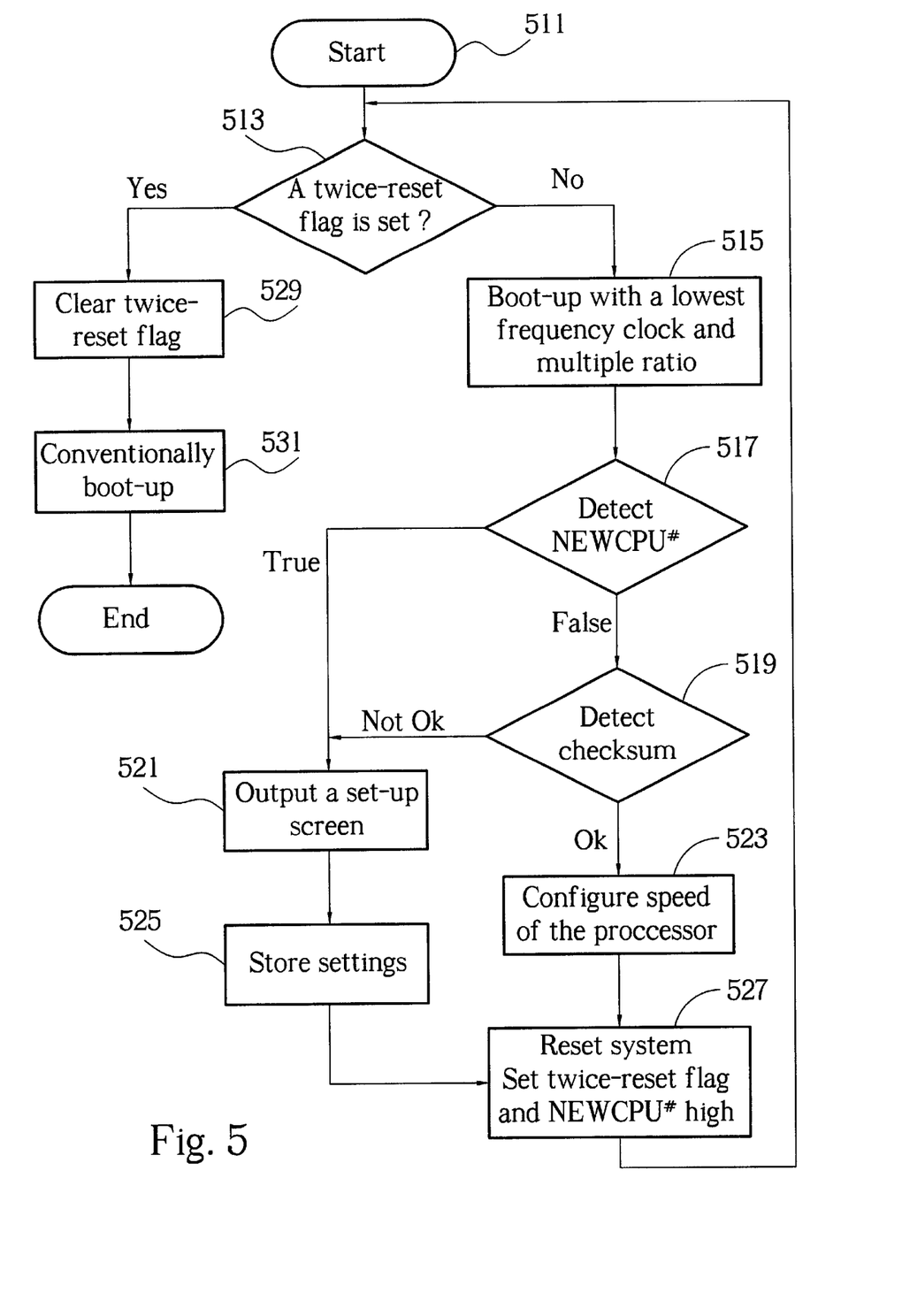
FIG. 5 discloses the operation flow chart of the invention.

The operation procedures of the invention may be fully understood by referencing FIG. 5 along with the following recitations.

The procedure starts in block 511 to power on the system. In block 513, the procedure detects whether a twice-reset flag is in SET condition. The SET condition of the twice-reset flag is representative of the computer system being reset twice as detailedly described below. If the twice-reset flag is set in block 513, the procedure, in block 529, clears the twice-reset flag, and afterwards, in block 531, executes a conventional and well known boot-up procedure of the BIOS.

As the twice-reset flag is not in SET state in block 513, the invention, in block 515, uses a lowest frequency clock and a lowest frequency multiple ratio parameter to boot up the system. Afterwards, in block 517, the inventions detects the NEWCPU# signal to decide whether the processor in the system has been replaced. If the replacement of CPU is decided, in block 521, the invention outputs a set-up screen on the display device. In this set-up menu, the user will be requested to input the nominal frequency value and associated settings corresponding to the processor and system. If it is false in block 517, in block 519, the invention detects the checksum data in the CMOS RAM. If there is no error, in block 523, the invention, in accordance with data in the CMOS RAM, configures the speed of the processor. Afterwards, in block 527, the invention resets the system the second time, sets the twice-reset flag and resets the NEWCPU# signal to high level. If the checksum of CMOS RAM is wrong in block 519, the invention performs the procedure in block 521. After the steps in block 521, the invention goes to block 525 to store the settings into the CMOS RAM which are accessed during next power-on session of the computer system.

Therefore, as the CPU is inserted for first time into the socket 11 on the mother board, the insert/remove detect circuit 13 immediately detects this condition and set the NEWCPU# signal to low level which is accessed by a software routine, i.e. the BIOS. Meanwhile, the processor signal generation circuit 17 supplies a set of parameter signals, which definitely successfully boot up the system, to the processor. The system's BIOS reads the flags configured by the insert/remove detect circuit 13, i.e. the twice-reset flag and the NEWCPU# signal to determine if the current user has ever replaced the CPU. If the user has not replaced the CPU, the system will operate in accordance with the data in the CMOS RAM which are configured and stored during the previous session.

Once, during the lifetime of the system, the CPU is replaced by a new one which changes the NEWCPU# signal to low level and the twice-reset flag is in non-SET state, a re-configuration menu is shown on the display device to request the adequate settings from the user. The settings from the user will be saved in the CMOS RAM and used in the next power-on session of the computer system. It is known that the CMOS RAM is connected to the ISA bus. After the re-configuration instructed by the user, the system is operated at the best condition using the parameter values from I/O port 15.

Figure 6:
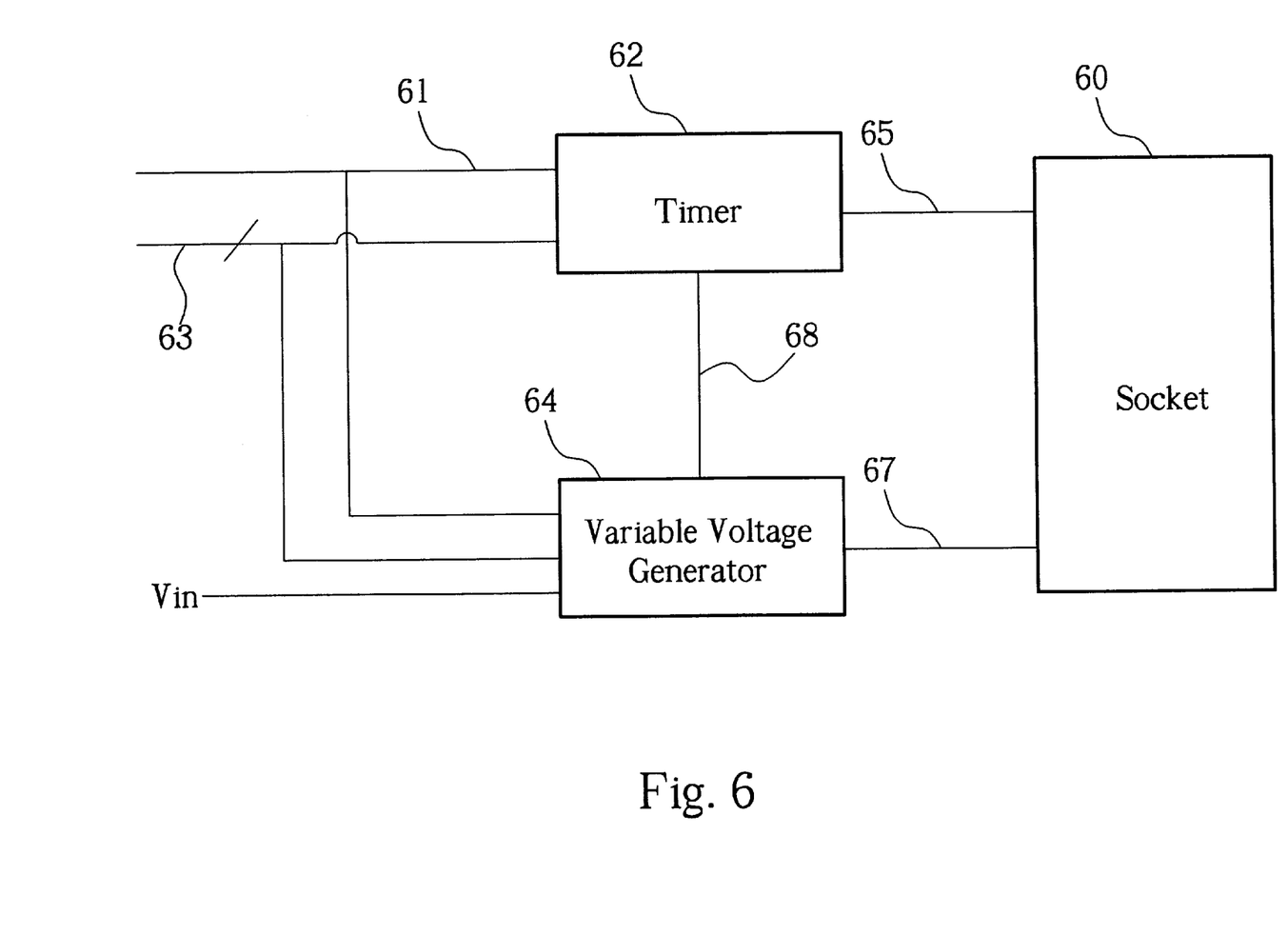
FIG. 6 discloses how the invention generates a corresponding operation voltage to a CPU inserted in the socket.

With the introduction of improved process technology, the operating voltage (Vcore) of PENTIUM processors of same category produced each year may be different. FIG. 6 shows the circuit blocks provided by another embodiment of the invention to tackle the issue of different operating voltages of PENTIUM processors of same category. As shown, the embodiment includes a processor operating voltage detection circuit consisting of a timer 62 and a variable voltage generator 64.

When the system is powered on for the first time, the power-on reset signal 61 enters the variable voltage generator 64 and resets the timer 62. Afterwards, the timer 62 outputs a processor reset signal 65 to the processor in the socket 60. Meanwhile, the variable voltage generator 64 outputs a lowest operating voltage to the processor in the socket 60. Correspondingly, we implement some predetermined sequences in BIOS which instruct the processor to perform access operation, i.e. read or write, to the I/O ports. If the processor may operate those sequences in stable condition for a period of time without hang-up, the BIOS outputs a disable command on the command line 63 to the timer 62 to disable the timer 62. And the current output voltage on the line 67, which is the actual allowable operating voltage for the inserted processor, is used to operate the processor. It is highly possible that an actual allowable operating voltage for a processor differs from that specified in the specification provided by the manufacture. Therefore, the invention then displays, via the assistance of the BIOS, a menu on the screen of the monitor which requests the user to input an accurate operating voltage on the specification to run the processor.

If, run by the lowest operating voltage, the processor can not execute those sequences in stable condition and/or hang-up, then the processor can not issue the processor command over the command line 63 under the instruction of BIOS. When the timer 62 does not detect the activated signal over the command line 63 within a predetermined time period, the timer 62 will re-issue the processor reset signal 65 and, via the control signal line 68, controls the variable voltage generator 64 such that the output voltage on the voltage line 67 increments by a predetermined amount, i.e. 0.1 volts.

If, after the above procedure, the system still can not operate, the above procedure is repeated until a disable command is detected on the signal line 63. Afterwards, the disable command disables the timer 62. And the current output voltage on the line 67, which is the actual allowable operating voltage for the inserted processor, is used to operate the processor. It is highly possible that an actual allowable operating voltage for a processor differs from that specified in the specification provided by the manufacture. Therefore, the invention then displays, via the assistance of the BIOS, a menu on the screen of the monitor which requests the user to input an accurate operating voltage prescribed on the specification to run the processor.

Figure 7:
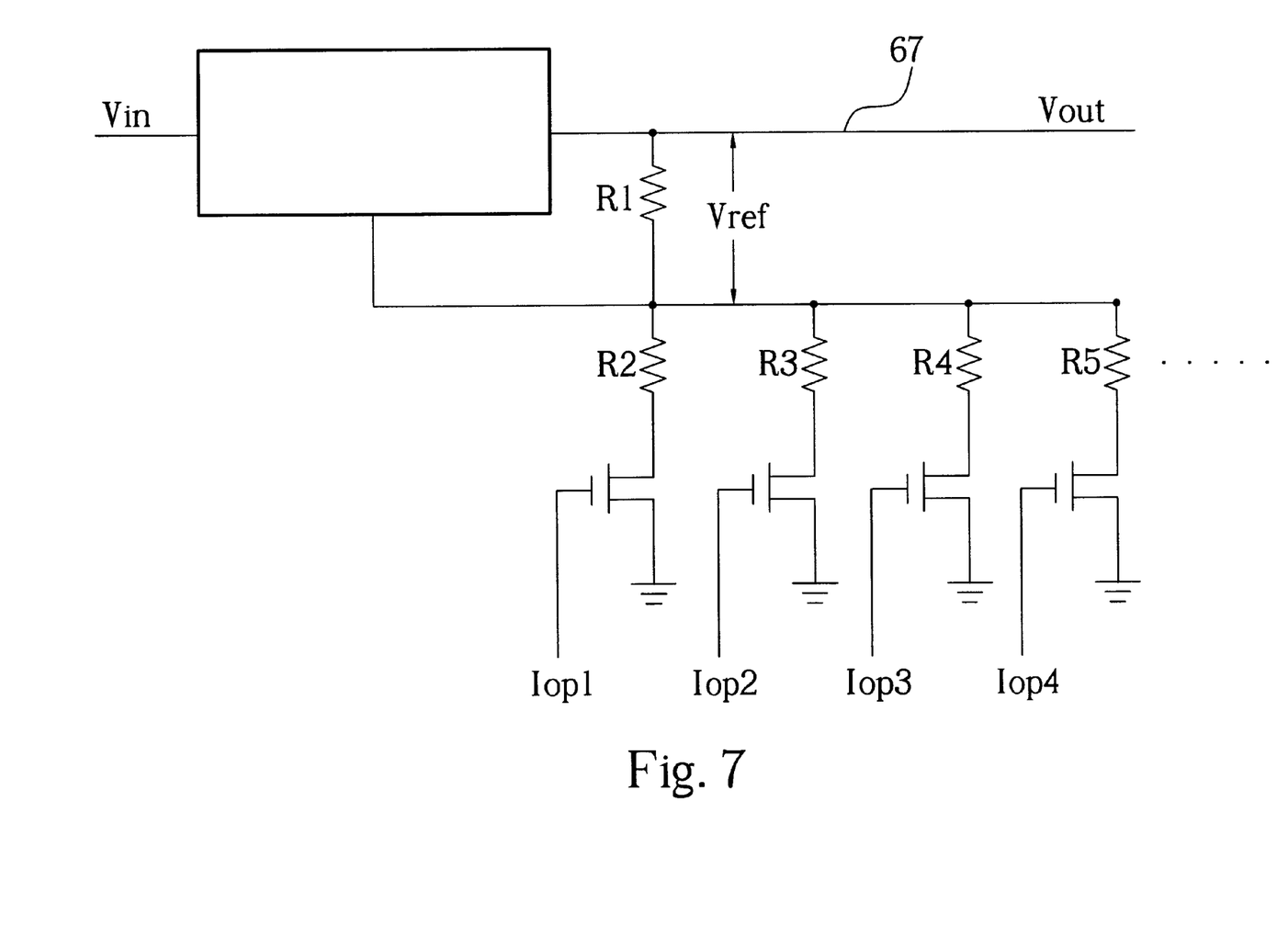
FIG. 7 discloses a conventional voltage regulator.

As mentioned above, after successful operation of the processor, the BIOS of the invention will display a menu on the screen which needs input information from the user regarding the nominal operating voltage to run the processor. A conventional voltage regulator as shown in FIG. 7 may be used to generate and output an operating voltage to the processor corresponding to the information from the user. In short, under the user's instruction, the BIOS may output a corresponding command which decodes to activate the IOP1, IOP2, IOP3, IOP4, etc. signals selectively. These IOP1, IOP2, IOP3, IOP4 . . . signals generate the operating voltage Vout corresponding to the user's instruction to the processor.

What is claimed is:

1. An apparatus for supplying an operating voltage to a processor, the processor, during power-on period of the processor and responsive to an access instruction, outputting a corresponding command over a command line, comprising:

a timer inputting a power-on reset signal and being coupled to the command line, for outputting a processor reset signal to the processor;

a variable voltage generator, inputting a power supply and being coupled to the command line, for generating the operating voltage, the variable voltage generator, responsive to the power-on reset signal, outputting an initial operating voltage to the processor such that the processor executes the access instruction;

wherein, as the timer does not detect a corresponding command over the command line during a predetermined time interval, the timer, via a control line, outputs a boost signal to the variable voltage generator which forces the variable voltage generator to increment the operating voltage by a predetermined increment amount, and the timer re-issues the processor reset signal.

2. The apparatus of claim 1, wherein the predetermined increment amount is 0.1 volts.

3. The apparatus of claim 1, wherein as the timer detects the corresponding command during the predetermined time interval over the command line, the operating voltage output enables operation of the processor.

* * * * *